United States Patent Office 3,016,815
Patented Jan. 16, 1962

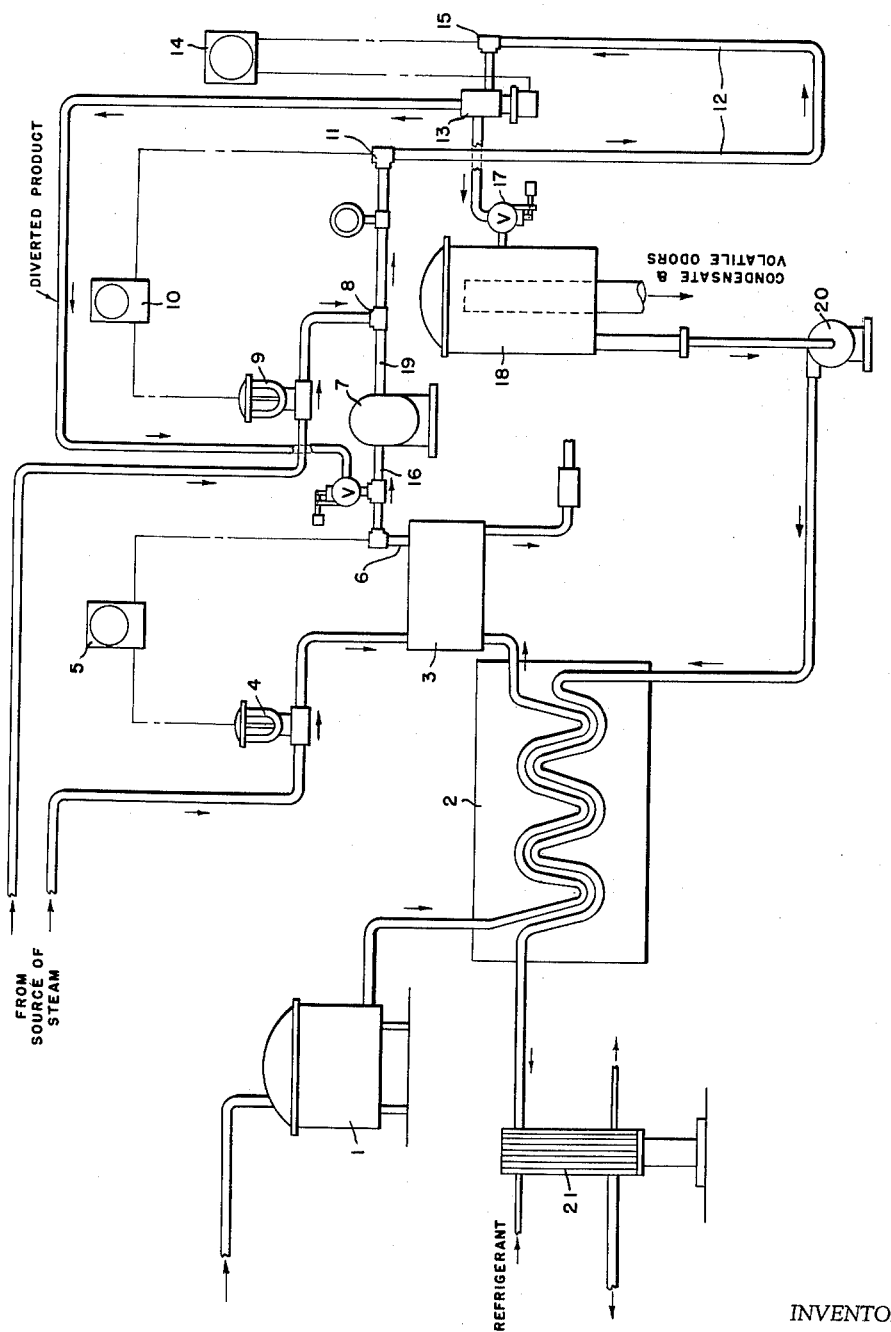

3,016,815
APPARATUS FOR HEAT-TREATING LIQUID FOOD STUFFS
Francis P. Hanrahan, Silver Spring, Md., assignor to the United States of America as represented by the Secretary of Agriculture
Filed May 19, 1958, Ser. No. 736,413
3 Claims. (Cl. 99—251)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the processing of heat-sensitive materials. In particular the invention relates to methods for steam-heating fluid foodstuffs for the purpose, for example, of causing sterilization, pasteurization, enzyme inactivation, or removal of undesirable volatile components from, or concentration of, the foodstuffs.

Many methods and devices using direct steam contact are known and used for the heating of liquid foodstuffs, such as milk. The most common method is to heat the liquid by gravitational fall of the product through steam under vacuum. This procedure has a number of disadvantages. Firstly, the heating is produced by entrainment of the milk, for example, in a vapor stream. Since this involves the handling of large volumes, use cannot be made of conventional flow diversion valves in those instances where it is either desirable or necessary to divert the flow of some or all of the product. Secondly, the passage is under negative pressure, and a diversion line would have to terminate in a chamber of higher vacuum if diverted flow was to occur. Thirdly, the rate of product transport is so rapid that an impracticable response time would be necessary if forward flow of subtemperature product was to be prevented. This method requires the product to be heated to a higher temperature because it cannot have a measured holding time. Thus, when high-temperature no-holding-time procedures are used, product quality suffers due to the occurrence of physical and chemical changes and the introduction of burned or cooked flavors.

One object of the present invention is to provide a process in which heating is obtained by steam under positive pressure whereby the foodstuff, e.g., milk, is brought to a suitable temperature virtually instantaneously. Another object is to provide a process wherein the foodstuff may be held at the proper temperature for a predetermined time, thus eliminating the use of the excessively high temperatures required by the older processes which provide no holding period.

Still another object is to provide an apparatus for carrying out the process of this invention.

These and other objects which will be apparent to those skilled in the art are accomplished in accordance with the present invention by means of the method and apparatus set forth in the description below in which the sole FIGURE of drawing represents a preferred form of apparatus suitable for carrying out the process of this invention.

The invention will be specifically illustrated by reference to the treatment of milk; but it will be obvious to one skilled in the art that any other liquid foodstuff may be treated. Thus, for example, liquid ice cream mixes or any other material which would tend to foul a conventional plate or tubular type heater may advantageously be processed according to the present invention.

In general, the process is carried out by introducing the liquid foodstuff under pressure into an instantaneous heating means, then transferring it still under pressure to a holding means which is adapted to maintain the liquid at a predetermined temperature for a predetermined time, and then transferring the liquid to cooling means. If for any cause the temperature of the liquid as it leaves the holding means is below the predetermined value, flow diversion means are provided between the holding means and the cooling means to divert the liquid back to the heater for reheating.

More particularly, according to the present invention, milk, for example, is introduced under pressure into a short mixing chamber at the same time that steam from a steam injector is introduced into the chamber, the proportions of milk and steam being such that the former is instantaneously heated to the desired processing temperature. The heated milk then immediately flows under pressure into a holding tube of such dimensions that the time required for passage is sufficient to hold the material at the proper temperature to accomplish the desired purpose, e.g. sterilization or pasteurization. Cooling of the heated milk then takes place under a vacuum whereby the added moisture which was produced by the condensing of the steam is removed together with odor-causing impurities.

The details of the process will be more readily understood from the following description with reference being made to the apparatus shown in the drawing.

Incoming raw milk enters float tank 1 where a constant level is maintained. From this tank the raw milk is drawn by suction by means of a sanitary timing pump through a suitable heat exchanger 2 where a great portion of the heating of the cold raw product and the cooling of the hot pasteurized product is accomplished by product-to-product regeneration. Any appropriate heat exchanger, such as a stainless steel plate heat exchanger, may be used for the purpose.

The raw product then passes through a sanitary preheater 3 which has a steam regulator 4 and an automatic controller 5 actuated by a connected thermal bulb (not shown) inserted in the milk outlet 6 of the preheater 3.

The preheated raw milk is discharged from the sanitary timing pump 7 through the steam injection heater 8 which has a steam regulator 9 provided with an automatic controller 10. The latter is actuated by a connected thermal bulb (not shown) inserted in the beginning 11 of the holding tube 12. The required time (0–60 seconds range) for the product to pass through this holding tube is determined by the capacity of pump 7 and the holding tube volume. At the end 15 of the holding tube there is connected a flow diversion valve 13 which is operated by a controller 14 actuated by a connected thermal bulb (not shown) inserted near the end 15 of the holding tube. If the milk is not up to pasteurization temperature when it reaches flow diversion valve 13 it is diverted back to the raw product line 16 between the sanitary preheater 3 and the sanitary timing pump 7. The diverted milk is thus mixed with raw milk coming from preheater 3, raising the temperature of the mixture in line 19. Steam injected by steam injector 8 into line 19 then increases the temperature to the proper level for pasteurization in holding tube 12.

If the milk is at the proper temperature when it reaches flow diversion valve 13 it has been pasteurized and is ready to be cooled. Still under pressure of the sanitary pump 7, the pasteurized product passes through a weight- or spring-loaded check valve 17 which causes a back-pressure on holding tube 12 and also permits the pasteurized milk to enter vapor-liquid separator 18. Check valve 17 further serves to seal off separator 18 if product flow has been diverted back to line 16. The pasteurized milk is flash cooled to a boiling temperature corresponding to the vacuum in vapor-liquid separator 18 and at the same time the condensate which was injected by steam injector 8 is removed along with volatile odors. The pasteurized and deodorized product is withdrawn from the vapor-liquid separator by means of a pump 20 which propels the treated product through the regenerator (No. 2) and through a cooler 21. If the incoming raw product is cold enough the temperature of the outgoing treated product will be lowered in this regenerator to a temperature which will make it unnecessary to use a cooler.

The following example illustrates the above-described processes:

A total of 5000 pounds of fresh raw milk was treated over a period of one hour in the apparatus shown in the drawing.

Raw milk at a temperature of 35° F. was drawn from float tank 1 through regenerator 2 where the temperature was raised to 100° F. From the regenerator, the milk flowed to preheater 3, where it was further heated to 130° F., and then pumped to steam injection heater 8. After leaving the steam injection heater the milk was at a temperature of 161° F., and remained at this temperature during a 15 second passage through holding tube 12. Under these conditions the milk was pasteurized and was permitted to pass through flow diversion valve 13 and back pressure valve 17 into liquid-vapor separator 18. The temperature of the milk on entering the separator was still 161° F. After cooling and removal of excess water and volatile odor-causing components, the milk left the separator at a temperature of 128° F. and was further cooled to 45° F. in regenerator 2.

Samples of the milk processed according to the above procedure were appraised by chemists and bacteriologists for chemical and bacteriological changes. Tests showed that the processed product was free from germs and viruses of milk-borne diseases, and from quality-jeopardizing bacteria, yeasts, molds, and milk enzymes. Samples of the processed milk were tasted for organoleptic qualities by a taste panel. It was found that no cooked or heated flavor could be detected.

The above-described procedures and apparatus enable these results to be achieved. Furthermore, since heating takes place by means of steam injection, the process and apparatus can also be used for treating liquid foodstuffs which would foul tubular or plate-type heaters. Thus, the apparatus can be used to pasteurize an ice cream mix at temperatures of 165° F. or higher. When used for such purpose the holding tube should be of such length as to provide a holding time of 30 seconds.

I claim:

1. Apparatus for heat treating liquid foodstuffs comprising a line for carrying a liquid foodstuff; a pump for moving said liquid foodstuff through said line under pressure; a steam injection heater connected to said line after said pump for instantaneously raising the entire body of liquid foodstuff to a predetermined treating temperature; an elongated holding tube for receiving heated liquid foodstuff, said holding tube having an input end thereof connected to said line after the steam injection heater and an outlet end thereof connected to a first valve comprising a flow diversion valve including two outlet ends for directing flow of liquid in one of two selected directions through one of the said two outlet ends of said flow diversion valve, said elongated holding tube being of such dimensions that the liquid foodstuff in passage between said inlet end and outlet end thereof will be maintained at the treating temperature for a predetermined time; vacuum cooling means for instantly cooling heated liquid foodstuff and removing part of the water content and volatile odor-producing materials from said liquid foodstuff; a second valve connecting said cooling means with one outlet end of said flow diversion valve, said second valve including means for maintaining a back pressure in the holding tube; liquid conveying means connecting the other outlet end of said flow diversion valve to the steam injection heater; and temperature-controlled means on the flow diversion valve for actuating said flow diversion valve to cause liquid foodstuff to flow from the holding tube to the steam injection heater if the temperature of the liquid foodstuff in the holding tube drops below a predetermined value.

2. Apparatus for heat treating milk comprising storage means for raw milk; a pump for moving raw milk under pressure; means for warming raw milk to a sub-treating temperature between said storage means and said pump; means for connecting said warming means to the storage means and means connecting said warming means to the pump; a milk conveying line after the pump connected to said pump; a steam injection heater for instantaneously raising an entire body of milk to a predetermined treating temperature connected to said milk conveying line; an elongated holding tube for receiving heated milk having an input end thereof connected to said milk conveying line after said steam injection heater and an outlet end thereof connected to first valve means comprising a flow diversion valve, said flow diversion valve including two outlet ends for directing flow of milk in one of two selected directions from said flow diversion valve, said elongated holding tube being of such dimensions that milk in passage between said inlet end and outlet end thereof will be maintained at the treating temperature for a predetermined time; vacuum cooling means for instantly cooling heat treated milk and for removing part of the water content and volatile odor-producing constituents thereof; second valve means connecting said cooling means with one outlet end of said flow diversion valve, said second valve including means for maintaining a back pressure in the holding tube; liquid conveying means connecting the other outlet end of said flow diversion valve with a source of raw milk; and temperature-controlled means on the flow diversion valve for actuating said flow diversion valve to divert insufficiently-heated milk from the outlet end of the holding tube to said source of raw milk.

3. The apparatus of claim 2 wherein the source of raw milk to which the other outlet end of the flow diversion valve is connected is the means which connects the warming means to the pump.

References Cited in the file of this patent

UNITED STATES PATENTS

| | | |
|---|---|---|
| 2,197,118 | Astle | Apr. 16, 1940 |
| 2,455,605 | Olson | Dec. 7, 1948 |
| 2,516,099 | Board et al. | July 25, 1950 |
| 2,636,430 | Brown et al. | Apr. 28, 1953 |
| 2,801,087 | Hawk | July 30, 1957 |
| 2,846,320 | Wittwer | Aug. 5, 1958 |